United States Patent [19]
Hunden

[11] 3,913,981
[45] Oct. 21, 1975

[54] DUAL TIRE WHEEL AND METHOD OF MAKING SAME

[75] Inventor: Bob L. Hunden, Anaheim, Calif.

[73] Assignee: Dennis A. Solis, Garden Grove, Calif.

[22] Filed: June 6, 1974

[21] Appl. No.: 476,907

[52] U.S. Cl. ............ 301/36 R; 29/159 R; 301/13 R
[51] Int. Cl.² ......................................... B60B 11/00
[58] Field of Search ... 301/5 R, 13 R, 13 SM, 36 R, 301/36 WP, 63 R, 65, 95, 97, 99; 29/159 R, 159.01, 159.1

[56] References Cited
UNITED STATES PATENTS
2,918,328  12/1959  Walls ............................. 301/13 R

*Primary Examiner*—Lloyd L. King
*Assistant Examiner*—D. W. Keen
*Attorney, Agent, or Firm*—Philip M. Hinderstein

[57] ABSTRACT

A method of converting a conventional pneumatic tire wheel, of the type including a hollow, cylindrical, thin wall portion, inner and outer radially outwardly extending tire retaining flanges made integral with the inner and outer edges, respectively, of the cylindrical portion, and a hub connected to the inner surface of the cylindrical portion for connection to the flange of a conventional drive axle, to a unitary rim and wheel structure for receipt of first and second pneumatic tires in parallel, spaced relationship.

2 Claims, 3 Drawing Figures

DUAL TIRE WHEEL AND METHOD OF MAKING SAME

BACKGROUND OF THE INVENTION

1. Field of the Invention

The present invention relates to a dual tire wheel and a method of making same and, particularly, to a method of converting a conventional pneumatic tire wheel to a unitary rim and wheel structure for receipt of first and second tires in parallel, spaced relationship.

2. Description of the Prior Art.

It is known to provide a unitary rim and wheel structure for receipt of first and second pneumatic tires in parallel, spaced relationship. Such unitary rim and wheel structures are disclosed in U.S. Pat. Nos. 1,239,824; 1,948,136; 2,272,961; 2,874,997; 2,918,328; 3,082,040; 3,328,088; 3,464,739; 3,713,701; and 3,790,218.

As can be seen from an inspection of said patents, essentially all dual tire wheels designed heretofore have been designed with a view towards providing a convenient technique for attaching a second wheel to first wheel, when necessary, such as for use with a tractor or truck. Because of this requirement of providing a ready means for assembly and disassembly of two wheels, prior dual wheel designs have required a complete redesign of the initial wheel structure itself. Furthermore, the resultant structure has been repleat with brackets, connecting bars, nuts and bolts, and other devices for permitting attachment of the two wheel sections. As a result, while the resultant wheel has been functional, it has been complex, expensive, and unattractive.

SUMMARY OF THE INVENTION

According to the present invention, there is provided a dual tire wheel and a method of making same which overcomes these problems entirely. The present dual tire wheel is not designed with the intent of providing a ready means for attaching a second wheel to a first wheel. Rather, the present dual tire wheel is a unitary structure for dual tire use at all times. Of great significance, the present method of making a dual tire wheel does not require a complete redesign of conventional pneumatic tire wheels. Rather, the present invention takes a conventional pneumatic tire wheel and readily converts it to a unitary rim and wheel structure for receipt of first and second pneumatic tires in parallel, spaced relationship. With the present design, no connection apparatus is required so that the completed wheel is simple, inexpensive, and attractive so that it may be used in a wide variety of situations.

OBJECTS

It is therefore an object of the present invention to provide a dual tire wheel.

It is a further object of the present invention to provide a method of making a dual tire wheel.

It is a still further object of the present invention to provide a method of converting a conventional pneumatic tire wheel to a unitary rim and wheel structure for receipt of first and second pneumatic tires in parallel, spaced relationship.

It is another object of the present invention to provide a dual tire wheel which may be readily connected to the flange of a conventional drive axle.

It is still another object of the present invention to provide a dual tire wheel which is attractive, with no visible connection apparatus.

Still other objects, features and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

DESCRIPTION OF THE PREFERRED EMBODIMENT

Figure 1:
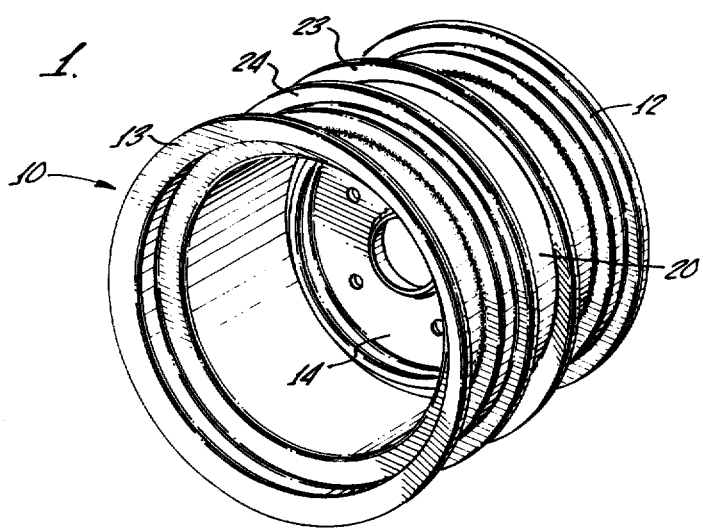
FIG. 1 is a perspective view of a dual tire wheel constructed in accordance with the teachings of the present invention.
Figure 2:
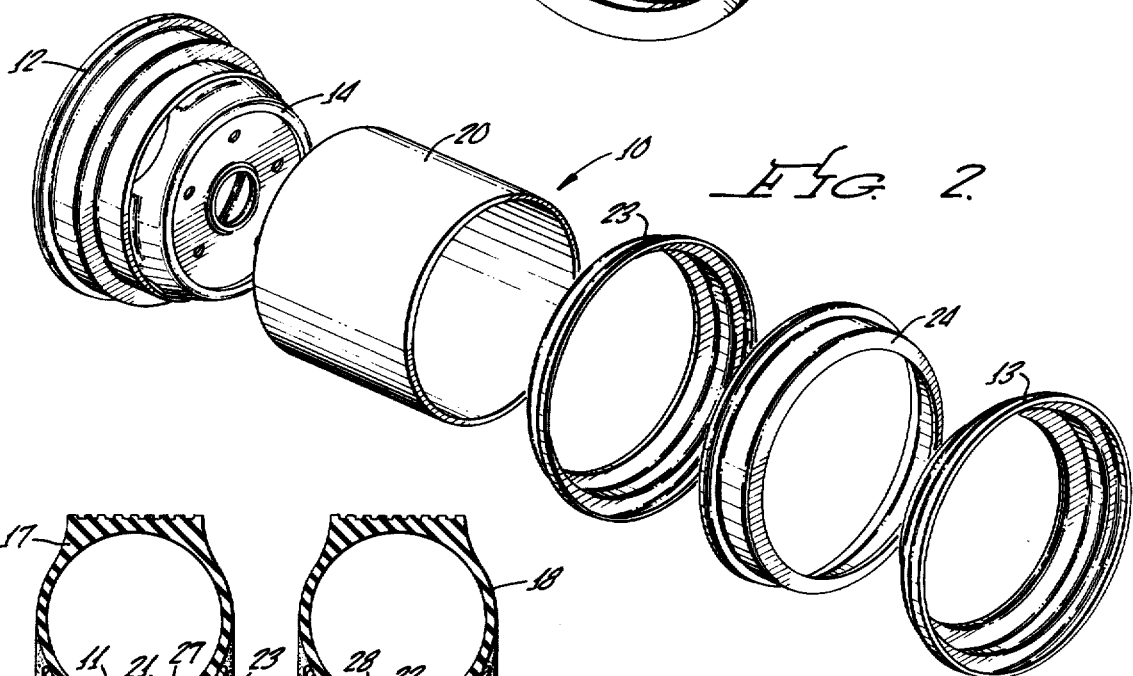
FIG. 2 is an exploded perspective view of the dual tire wheel of FIG. 1 showing the method of making the same.

Referring now to the drawings, there is shown a dual tire wheel, generally designated 10, which is constructed from a conventional pneumatic tire wheel. More specifically, a conventional pneumatic tire wheel includes a hollow, cylindrical thin wall portion 11, inner and outer radially, outwardly extending tire retaining flanges 12 and 13, respectively, made integral with the inner and outer edges, respectively, of cylindrical portion 11, and a disc shaped hub 14 connected to the inner surface of cylindrical portion 11, hub 14 being adapted for connection to the flange of a conventional drive axle.

Figure 3:
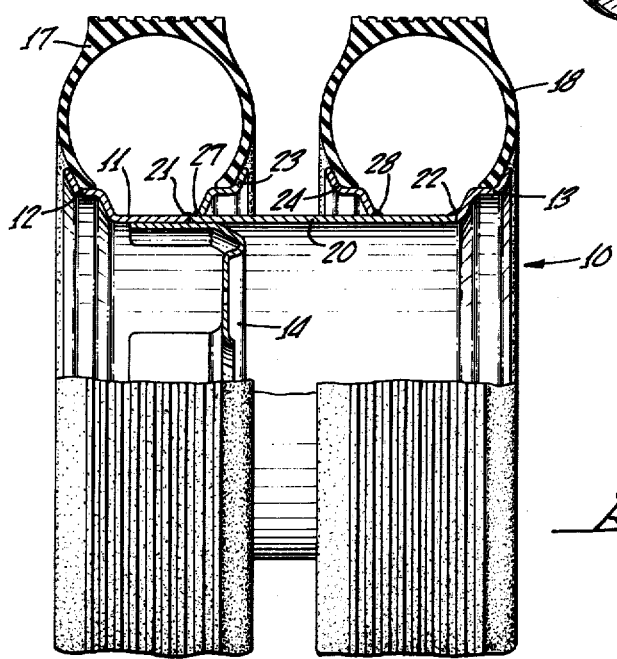
FIG. 3 is a cross-sectional view of the dual tire wheel of FIGS. 1 and 2.

According to the method of the present invention, a conventional pneumatic tire wheel of the type described above is converted to a dual tire wheel providing a unitary rim and wheel structure 10 for receipt of first and second pneumatic tires 17 and 18 in parallel, spaced relationship. More particularly, cylindrical portion 11 is cut along a plane between hub 14 and outer flange 13 so as to separate outer flange 13 from cylindrical portion 11, inner flange 12, and hub 14. As seen in FIG. 3, inner flange 12 becomes the inner flange of the inner tire 17 and outer flange 13 becomes the outer flange of the outer tire 18.

In order to separate flanges 12 and 13 by the required amount to achieve the above, dual tire wheel 10 includes a hollow, cylindrical, thin wall drum 20 having inside and outside diameters equal to the inside and outside diameters, respectively, of cylindrical portion 11 of wheel 10. Drum 20 is positioned between inner and outer flanges 12 and 13, respectively, with the opposite ends of drum 20 abutting against the cut ends of cylindrical portion 11. As will be described hereinafter, the opposite ends of drum 20 may be connected to cylindrical portions 11 by welding, at 21 and 22.

Dual tire wheel 10 further comprises first and second annular, ring-shaped, tire retaining flange members 23 and 24, respectively, flange member 23 having the same general configuration as outer flange 13 and flange member 24 having the same general configuration as inner flange 12. Furthermore, the inner diameters of flange members 23 and 24 are approximately equal to the outer diameter of drum 20. Flange members 23 and 24 are positioned in parallel, spaced relationship around drum 20 with flange member 23 being positioned in the same position relative to inner flange 12 as outer flange 13 previously occupied and flange member 24 being positioned in the same position relative to outer flange 13 as inner flange 12 previously occupied. Furthermore, flange members 23 and 24 may be readily connected to drum 20 such by welding, at 27 and 28, respectively.

The method of converting a conventional pneumatic tire wheel, of the type previously described, to a unitary rim and wheel structure for receipt of first and second pneumatic tires 17 and 18 should be obvious from the description of the structure provided above. Briefly, a conventional tire wheel has the cylindrical portion 11 thereof cut so as to separate outer flange 13 from cylindrical portion 11, inner flange 12, and hub 14. Drum 20 is positioned with one end thereof abutting against the cut end of cylindrical portion 11 of wheel 10 and the two parts are welded together, at 21. First flange member 23 is then positioned around drum 20, in the same position relative to inner flange 12 as outer flange 13 previously occupied, and flange 23 is welded to drum 20, at 27. Second flange member 24 is then positioned around drum 20 in parallel, spaced relationship relative to flange member 23 and flange member 24 is welded to drum 20, at 28. Finally, the cut-off outer flange 13 is abutted against the other end of drum 20, with the same spacing relative to flange member 24 as exists between inner flange 12 and flange member 23. Thereafter, outer flange 13 is welded to drum 20, at 22.

The resultant structure is simple, inexpensive, and highly attractive, as can be readily seen from an inspection of FIG. 1. There is no separate connecting apparatus to detract from the appearance of wheel 10. Furthermore, it may be connected to the flange of a drive axle in the usual manner without requiring any modification thereto.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. A dual tire wheel resulting from a method comprising the steps of:
   starting with a conventional pneumatic tire wheel, of the type including a hollow, cylindrical thin wall portion, inner and outer radially outwardly extending tire retaining flanges made integral with the inner and outer edges, respectively, of said cylindrical portion, and a hub connected to the inner surface of said cylindrical portion for connection to the flange of a conventional drive axle;
   cutting said cylindrical portion so as to separate said outer flange from said cylindrical portion, said inner flange, and said hub;
   positioning a hollow, cylindrical, thin wall drum having inside and outside diameters equal to the inside and outside diameters, respectively, of said cylindrical portion of said wheel with one end thereof abutting against the cut end of said cylindrical portion of said wheel and welding said one end of said drum to said cylindrical portion of said wheel;
   positioning a first annular, ring-shaped, tire retaining flange member, having the same general configuration as said outer flange, around said drum in the same position relative to said inner flange as said outer flange previously occupied and welding said first flange member to said drum;
   positioning a second annular, ring-shaped, tire retaining flange member having the same general configuration as said inner flange, around said drum in parallel spaced relationship relative to said first flange member and welding said second flange member to said drum; and
   positioning said cut-off outer flange abutting against the other end of said drum in the same position relative to said second flange member as said inner flange previously occupied and welding said outer flange to said drum.

2. A method of converting a conventional pneumatic tire wheel, of the type including a hollow, cylindrical thin wall portion, inner and outer radially outwardly extending tire retaining flanges made integral with the inner and outer edges, respectively, of said cylindrical portion, and a hub connected to the inner surface of said cylindrical portion for connection to the flange of a conventional drive axle, to a dual tire wheel comprising the steps of:
   cutting said cylindrical portion so as to separate said outer flange from said cylindrical portion, said inner flange, and said hub;
   positioning a hollow, cylindrical, thin wall drum having inside and outside diameters equal to the inside and outside diameters, respectively, of said cylindrical portion of said wheel with one end thereof abutting against the cut end of said cylindrical portion of said wheel and welding said one end of said drum to said cylindrical portion of said wheel;
   positioning a first annular, ring-shaped, tire retaining flange member, having the same general configuration as said outer flange, around said drum in the same position relative to said inner flange as said outer flange previously occupied and welding said first flange member to said drum;
   positioning a second annular, ring-shaped, tire retaining flange member having the same general configuration as said inner flange, around said drum in parallel spaced relationship relative to said first flange member and welding said second flange member to said drum; and
   positioning said cut-off outer flange abutting against the other end of said drum in the same position relative to said second flange member as said inner flange previously occupied and welding said outer flange to said drum.

* * * * *